United States Patent
Shimizu

(10) Patent No.: US 9,738,167 B2
(45) Date of Patent: Aug. 22, 2017

(54) CONTACTLESS CHARGING DEVICE AND METHOD FOR CONTROLLING POWER SUPPLY

(71) Applicant: PIONEER CORPORATION, Kanagawa (JP)

(72) Inventor: Akira Shimizu, Saitama (JP)

(73) Assignee: PIONEER CORPORATION, Kanagawa (JP)

( * ) Notice: Subject to any disclaimer, the term of this patent is extended or adjusted under 35 U.S.C. 154(b) by 145 days.

(21) Appl. No.: 14/782,081

(22) PCT Filed: Apr. 2, 2013

(86) PCT No.: PCT/JP2013/060038
§ 371 (c)(1),
(2) Date: Oct. 2, 2015

(87) PCT Pub. No.: WO2014/162508
PCT Pub. Date: Oct. 9, 2014

(65) Prior Publication Data
US 2016/0052407 A1 Feb. 25, 2016

(51) Int. Cl.
*H02J 7/00* (2006.01)
*H01F 27/42* (2006.01)
*B60L 11/18* (2006.01)
(Continued)

(52) U.S. Cl.
CPC ............ *B60L 11/182* (2013.01); *H02J 7/0029* (2013.01); *H02J 7/025* (2013.01); *H02J 7/042* (2013.01); *H02J 17/00* (2013.01)

(58) Field of Classification Search
CPC ......... B60L 11/182; H02J 7/042; H02J 7/025; H02J 5/005
(Continued)

(56) References Cited

U.S. PATENT DOCUMENTS 8,970,069 B2 *   3/2015   Urano ...................... H01F 38/14
                                                          307/104
9,616,292 B2 *   4/2017   Orfield ............... A63B 24/0062
(Continued)

FOREIGN PATENT DOCUMENTS

JP   2011-229264   11/2011
JP   2012-115036    6/2012
(Continued)

OTHER PUBLICATIONS

Japanese Office Action dated Nov. 30, 2016 in corresponding Japanese Patent Application No. 2015-509761.
(Continued)

*Primary Examiner* — M'Baye Diao
(74) *Attorney, Agent, or Firm* — Young & Thompson

(57) ABSTRACT

A plurality of projections is arranged in a matrix on the upper surface of the housing of a contactless charging unit (110). When supplying power wirelessly to an onboard power reception device, a beam emission unit in a beam reception and emission unit (120) emits a laser beam progressing along the upper surface of a power transmission unit (170) to scan the upper part of the entire upper surface of the power transmission unit (170). When receiving a reflected beam, the beam reception unit in the beam reception and emission unit (120) sends the results of beam reception to a determination unit. The determination unit determines the presence or absence of a foreign substance supported on at least one projection existing on the upper surface of the contactless charging unit (110) on the basis of the results of beam reception. Subsequently, when a foreign substance is present on the upper surface of the contactless charging unit (110), the control unit generates a supply control command indicating that no power is to be supplied to the onboard power reception device and sends the command to a supply unit. This will enable wireless power supply using the contactless system without any problem in terms of safety.

8 Claims, 10 Drawing Sheets

(51) Int. Cl.
*H02J 17/00* (2006.01)
*H02J 7/02* (2016.01)
*H02J 7/04* (2006.01)

(58) Field of Classification Search
USPC .......................... 320/108; 307/104; 455/573
See application file for complete search history.

(56) References Cited

U.S. PATENT DOCUMENTS

| | | | |
|---|---|---|---|
| 2012/0049991 A1* | 3/2012 | Baarman | H01F 17/0013 336/199 |
| 2012/0326662 A1 | 12/2012 | Matsumoto et al. | |
| 2014/0339905 A1 | 11/2014 | Moritsuka et al. | |
| 2015/0042269 A1* | 2/2015 | Koren | H02J 7/025 320/108 |
| 2015/0249346 A1* | 9/2015 | Shinoda | H02J 5/005 307/104 |

FOREIGN PATENT DOCUMENTS

| | | |
|---|---|---|
| JP | 2012-257404 | 12/2012 |
| JP | 2013-027116 | 2/2013 |
| JP | 2014-107915 | 6/2014 |
| JP | 2014-230299 | 12/2014 |
| JP | 2014-236540 | 12/2014 |

OTHER PUBLICATIONS

International Search Report, PCT/JP2013/060038, Jun. 11, 2013.
Written Opinion, PCT/JP2013/060038, Jun. 11, 2013.

* cited by examiner (A)

(B)

CONTACTLESS CHARGING DEVICE AND METHOD FOR CONTROLLING POWER SUPPLY

TECHNICAL FIELD

The present invention relates to a contactless charging device, to a method for controlling a power supply, to a power supply control program, and to a recording medium upon which such a power supply control program is recorded.

BACKGROUND ART

In recent years, vehicles have become widespread that employ batteries as sources of propulsion power, these being both electric automobiles that employ batteries as sources for all of their propulsion power and so-called hybrid automobiles that employ batteries as sources for part of their propulsion power. Along with the increasing popularity of vehicles of this type, contactless charging systems are appearing that, when a battery with which such a vehicle is equipped is to be charged up, perform wireless changing in a contactless manner without utilizing any electricity transmission cable physically connected between a charger of a charging facility and the vehicle.

With this type of contactless charging system, a power supply device (hereinafter termed a "contactless charging device") including a power transmission part (i.e. a power transmission coil) is installed in the ground surface of a parking space or the like, and a power reception device (hereinafter termed an "onboard power reception device") having a power reception part (i.e. a power reception coil) is disposed under the floor of a vehicle. And it is arranged for the power reception part disposed in the vehicle to oppose the power transmission part installed in the ground surface, so that charging up of the battery is performed. One example of such a device for wirelessly supplying electrical power according to this type of contactless method employs electromagnetic induction.

With such a contactless charging system, if contactless charging is performed in a state with some metallic body present on top of the power transmission part (i.e. the power transmission coil) of the contactless charging device, then this metallic body experiences heating due to the high output electromagnetic waves. Contactless charging in this type of state not only can lead to a fault in the contactless charging device, but can also be a cause of fire. The occurrence of this type of situation is a problem from the point of view of safety during the use of a contactless charging device.

Accordingly, techniques of various kinds have been proposed for detecting that a metallic body (hereinafter this sort of metallic body will simply be termed a "body" or a "foreign body") is present above the power transmission part (i.e. the power transmission coil) of a contactless charging device. One among these proposed techniques employs the result of detection by a temperature sensor (refer to Patent Document #1, hereinafter termed the "prior art example"). In the technique of this prior art example, in a contactless charging device that employs the electromagnetic induction method, along with a first temperature detection circuit measuring the temperature around the power transmission coil via a thermistor, also a second temperature detection circuit measures the environmental temperature via a thermistor. And, if the value obtained by subtracting the environmental temperature from the temperature around the power transmission coil is greater than a threshold value which is set in advance, then it is determined that a metallic body is present over the power transmission part, and the supply of power is stopped or a notification of anomaly is supplied to the user.

PRIOR ART DOCUMENT

Patent Documents

Patent Document #1: Japanese Laid-Open Patent Publication 2011-229264.

SUMMARY OF THE INVENTION

Problem to be Solved by the Invention

With this prior art example described above, it is necessary to dispose a thermistor (i.e. a temperature sensor) in the neighborhood of the power transmission coil, for measuring the temperature around the power transmission coil. However, if this type of structure is employed, then it is necessary for this thermistor not to be of a type that may be damaged by the magnetic flux passing through the power transmission coil. Moreover there is a danger that, due to the considerable level of the output power of the contactless charging device, the thermistor itself may heat up due to induced heat. Furthermore, in the prior art example described above, it is not possible to detect a metallic body until the difference between the temperature around the power transmission coil and the environmental temperature rises to at least the threshold value, and also there is a possibility that it may not be possible to detect the metallic body with good accuracy, depending upon the positional relationship between the thermistor and the metallic body.

Due to this, there is a demand for a technique that is capable of detecting that a foreign body is present above the power transmission part (i.e. the power transmission coil) of a contactless charging device, without any sensor being disposed in the neighborhood of the power transmission coil, and moreover with good accuracy. Fulfilling this requirement is one of the problems which the present invention is desired to solve.

The present invention has been conceived in consideration of the circumstances described above, and its object is to provide a novel contactless charging device and a novel method for controlling a power supply that are capable of supplying electrical power wirelessly using a contactless method without involving any safety problems.

Means for Solving the Problems

When considered from a first aspect, the present invention is a contactless charging device having a power transmission part that supplies power wirelessly to an external power reception part, comprising: a plurality of projections that are disposed on the upper surface of said power transmission part; a beam emission part emitting light that progresses over the upper surface of said power transmission part; a body detection part, on the basis of light emitted by said beam emission part, detecting the presence or absence of a body that is supported by at least one of said projections; and a control part controlling the supply of power by said power transmission part on the basis of the result of detection by said body detection part.

Furthermore, when considered from a second aspect, the present invention is a method for controlling a power supply used in a contactless charging device having both of a power transmission part that supplies power wirelessly to an external power reception part, and a plurality of projections that are disposed on the upper surface of said power transmission part, comprising the steps of: a light emission process of a beam emission part emitting light that progresses over the upper surface of said power transmission part; a body detection process of, on the basis of light emitted by said beam emission part detecting the presence or absence of a body that is supported by at least one of said projections; and a control process of controlling the supply of power by said power transmission part on the basis of the result of detection by said body detection process.

And, when considered from a third aspect, the present invention is a non-transient computer readable medium having recorded thereon a power supply control program that, when executed, causes a computer in a contactless charging device having a power transmission part that supplies power wirelessly to an external power reception part to execute the method for controlling a power supply according to the present invention.

REFERENCE SIGNS LIST

Figure 1:
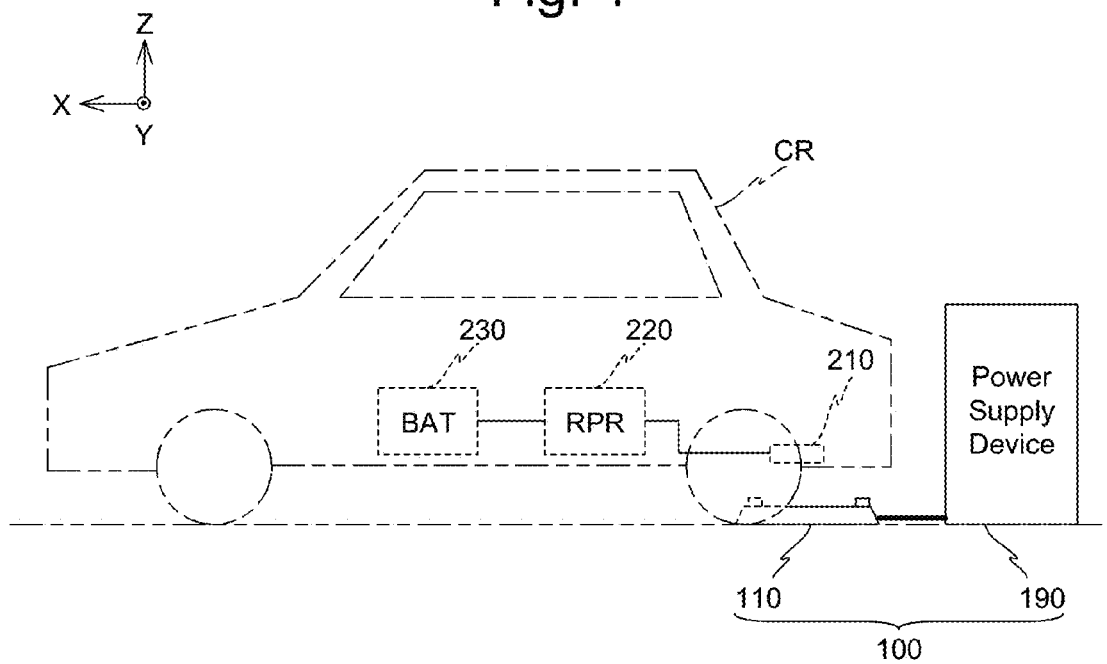
FIG. 1 is a figure for explanation of the relationship between a contactless charging device according to an embodiment of the present invention and an onboard power reception device that is mounted to a vehicle.

100 . . . contactless charging device
121 . . . beam emission part
129 . . . beam reception part
129B . . . beam reception part
140 . . . reflection part
150 . . . determination part
170 . . . power transmission part
180 . . . control part
PR . . . projection

EMBODIMENTS FOR CARRYING OUT THE INVENTION

In the following, an embodiment of the present invention will be explained with reference to FIGS. 1 through 9. Note that, in the following explanation and in the drawings, the same reference symbols are appended to elements that are the same or equivalent, and duplicated explanation is omitted.

[Configuration]

In this embodiment, as shown in FIG. 1, as an example, a contactless charging device 100 will be explained that, by employing an electromagnetic induction method, performs supply of power to an onboard power reception device 200 that is mounted to an electric automobile CR (hereinafter termed the "vehicle"). This contactless charging device 100 is disposed on the ground surface of a parking space. Here it will be supposed that, as shown in the figure, a coordinate system (X,Y,Z) in FIG. 1 is defined as a coordinate system in which the +Z axis direction is vertically upward.

Figure 2:
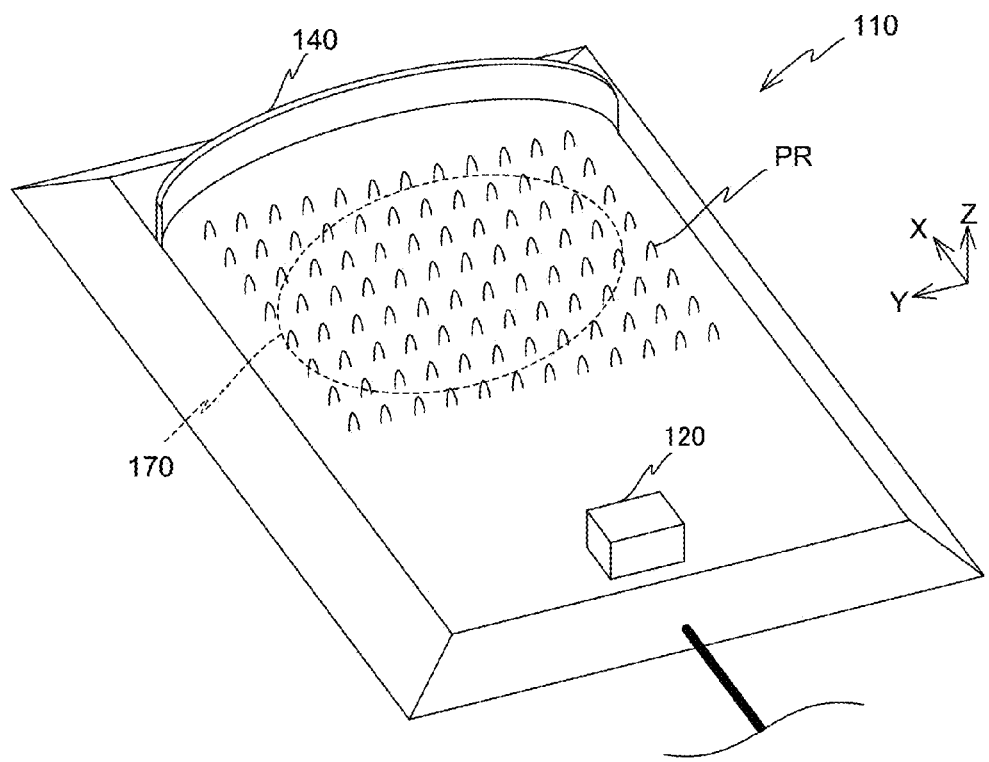
FIG. 2 is a figure showing the external appearance of the contactless charging unit of FIG. 1.

FIG. 2 and FIGS. 3(A) and 3(B) show the external appearance of the contactless charging device 100 according to an embodiment of the present invention (in more detail, of a contactless charging unit 110 thereof) that, as described above, is disposed on the ground surface of a parking space. Here, FIG. 3(A) is a figure showing the external appearance of the contactless charging device 100 disposed in the parking space as viewed from the +Z direction (in other words, from vertically above). Moreover, FIG. 3(B) is a figure showing the external appearance of the contactless charging device 100 disposed in the parking space as viewed from the +Y direction.

Figure 4:
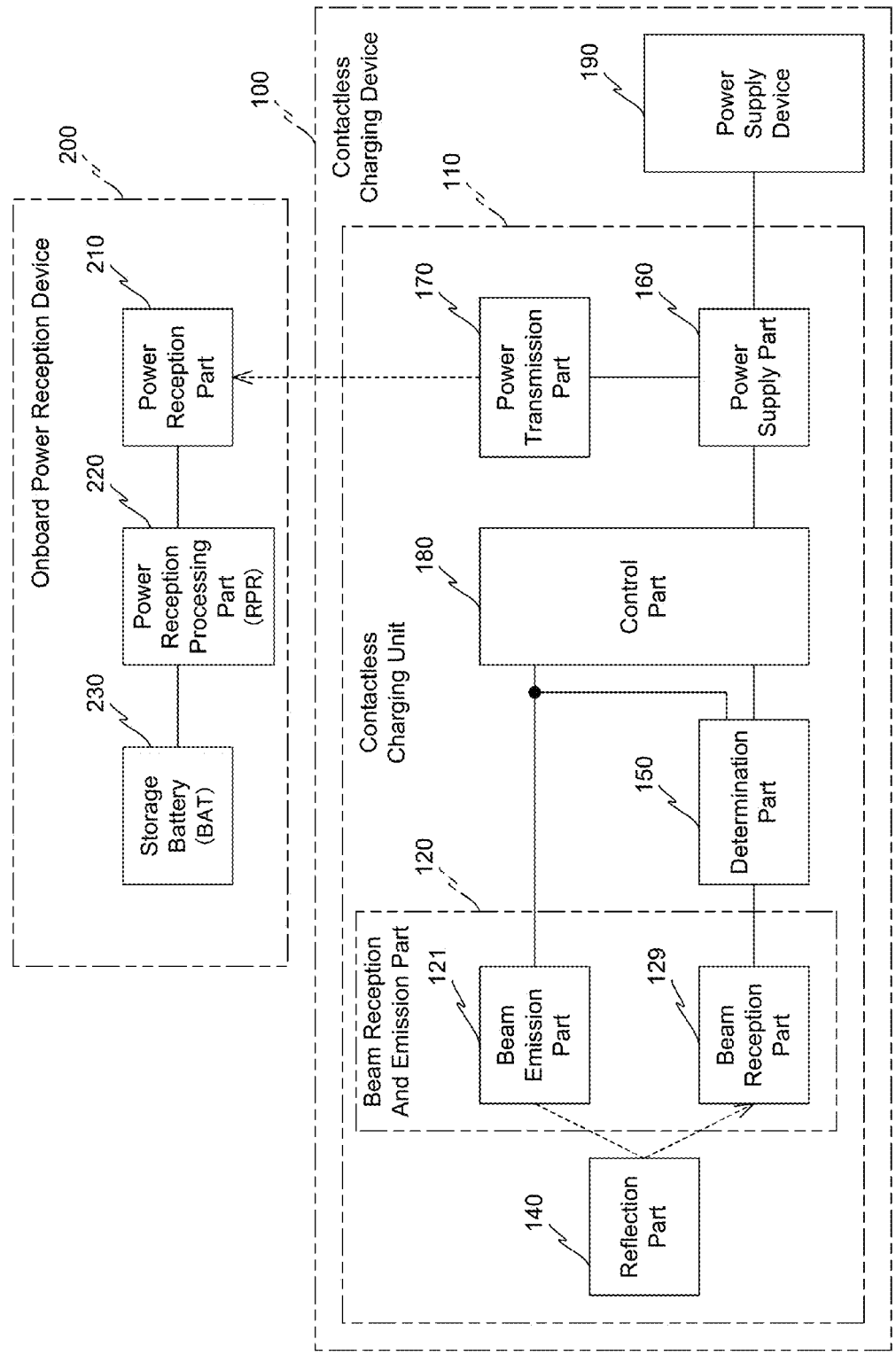
FIG. 4 is a block diagram schematically showing the configuration of a contactless charging device according to an embodiment of the present invention, and the configuration of an onboard power reception device.

Furthermore, the schematic configurations of the contactless charging device 100 and of the onboard power reception device 200 are shown in FIG. 4.

<Configuration of the Onboard Power Reception Device 200>

Before explanation of the configuration of the contactless charging device 100 of the present invention, the configuration of the onboard power reception device 200 will be explained. As shown overall in FIGS. 1 and 4, the onboard power reception device 200 comprises a power reception part 210, a power reception processing part (RPR) 220, and a storage battery (BAT) 230.

The power reception part 210 comprises a power reception coil that is disposed under the floor of the vehicle CR. When the storage battery 230 is to be charged up by this power reception part 210, alternate current, AC, electromotive force is induced by magnetic flux generated by the contactless charging device 100 (in more detail, by a power transmission part 170 thereof that will be described hereinafter). And this induced AC electromotive force is inputted to the power reception processing part 220. The power reception processing part 220 converts this induced AC electromotive force into direct current, DC, power, and charges this DC power into the storage battery 230.

Note that, in this embodiment, when charging is to be started, the onboard power reception device 200 transmits a request for supply of electrical power to be started to the contactless charging device 100 by using wireless communication. Moreover, when charging of the storage battery 230 is completed or the like, the onboard power reception device 200 transmits a request for electrical power supply to be terminated to the contactless charging device 100 by using wireless communication.

<Configuration of the Contactless Charging Device 100>

Next, the configuration of the abovementioned contactless charging device 100 will be explained.

As shown overall in FIGS. 1 through 4, the contactless charging device 100 comprises a contactless charging unit 110 and a power supply device 190. And the contactless charging unit 110 is connected to the power supply device 190 via a cable.

During wireless supply of electrical power to the onboard power reception device 200 (refer to FIG. 1), the upper surface in the +Z direction of the contactless charging unit 110 described above is positioned to oppose the power reception part 210 which is disposed under the floor of the vehicle CR. Moreover, a plurality of transparent projections PR that are made from a material that does not heat up during wireless supply of electrical power are disposed over the upper surface in the +Z direction of the casing of the contactless charging unit 110 (refer to FIG. 2 and FIGS. 3(A) and 3(B)). Note that, in the figures showing the external appearance of the contactless charging unit 110, the reference symbol (PR) is appended to one only of this plurality of projections, as a representative.

<<Arrangement of the Projections PR>>

As shown overall in FIGS. 3(A) and 3(B), all of the plurality of projections PR mentioned above have the same height, and they are arranged in a lattice configuration over the entire upper surface of the power transmission part 170, which will be described hereinafter. And the gaps between neighboring projections are determined according to the supposed shapes of bodies that are to be subjects for detection. Here, the heights of the plurality of projections are set to be greater than the typical heights of drops of water that might be present upon the upper surface of the casing of the charging unit 110, in order to ensure that such water drops are not detected as being foreign bodies.

In this embodiment, it is supposed that the body that is to be the subject of detection is a bit of metal shaped as a square. And the minimum size of such a bit of metal to be detected is determined in advance on the basis of experiment, simulation, experience or the like, according to the magnitude of the output voltage of the contactless charging device 100, the balance between the amount of heat generated in such a bit of metal when electrical power at that output voltage is supplied wirelessly and the amount of heat dissipation therefrom, the maximum permitted temperature of the contactless charging device 100, and so on.

Figure 5:
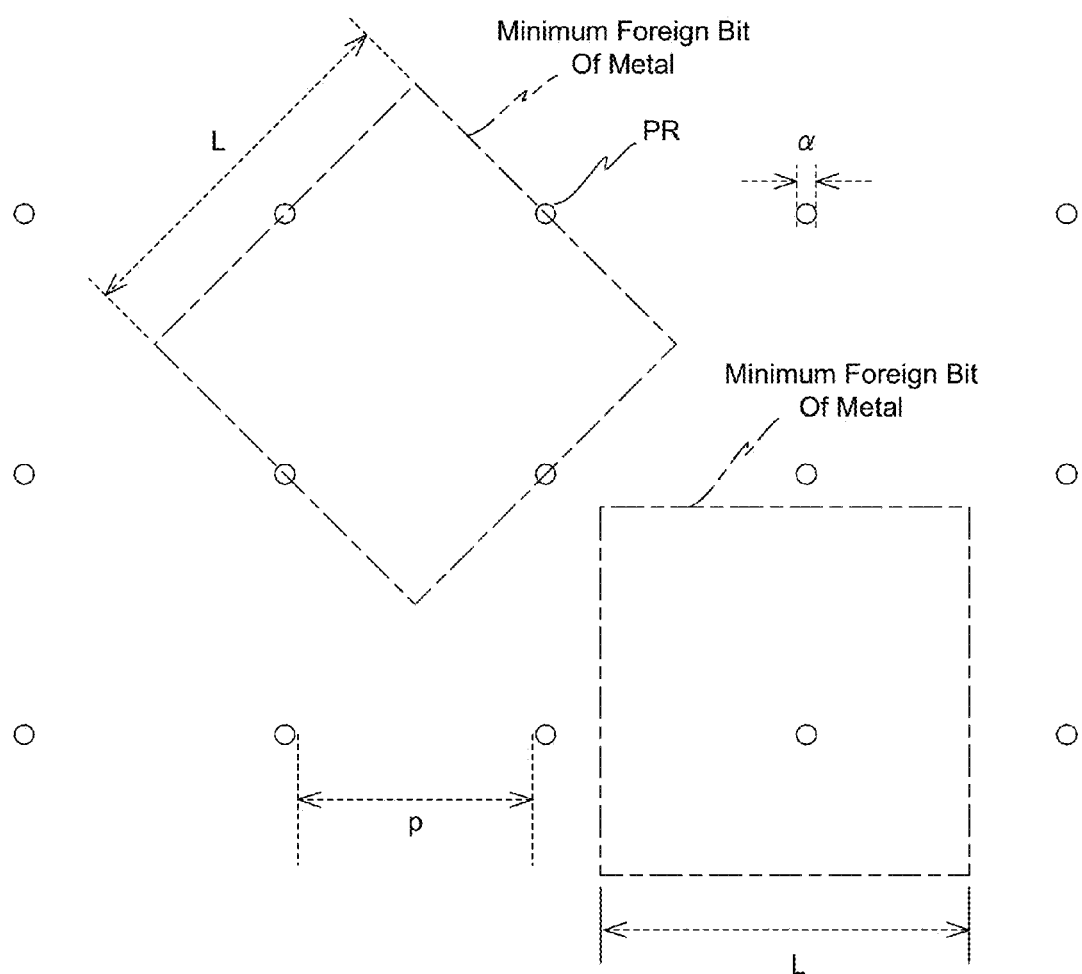
FIG. 5 is a figure for explanation of gaps between projections that are disposed on the contactless charging unit of FIG. 3.

Moreover the gaps between neighboring projections are determined so that if, as shown in FIG. 5, a minimum sized bit of metal that is supposed to be the subject of detection (also hereinafter termed a "minimum foreign bit of metal") is present upon the upper surface of the contactless charging unit 110, then such a minimum foreign bit of metal will be supported by at least one of the projections. In other words, the gap "p" between neighboring ones of the projections can be obtained by the following Equation (1), where "L" is the length of one side of the minimum foreign bit of metal and "α" is the diameter of the projections:

$$p=(L/2^{1/2})-\alpha \quad (1)$$

Note that, in this embodiment, a square shaped bit of metal with each side L=30.0 mm is considered to be the minimum foreign bit of metal. Thus in this embodiment, in order to detect this minimum foreign bit of metal, taking α as being 2.0 mm, from Equation (1) above, the gaps "p" between neighboring projections are set to p=19.2 mm.

<<<Configuration of the Contactless Charging Unit 110>>>

Next, the configuration of the contactless charging unit 110 will be explained.

Figure 3:
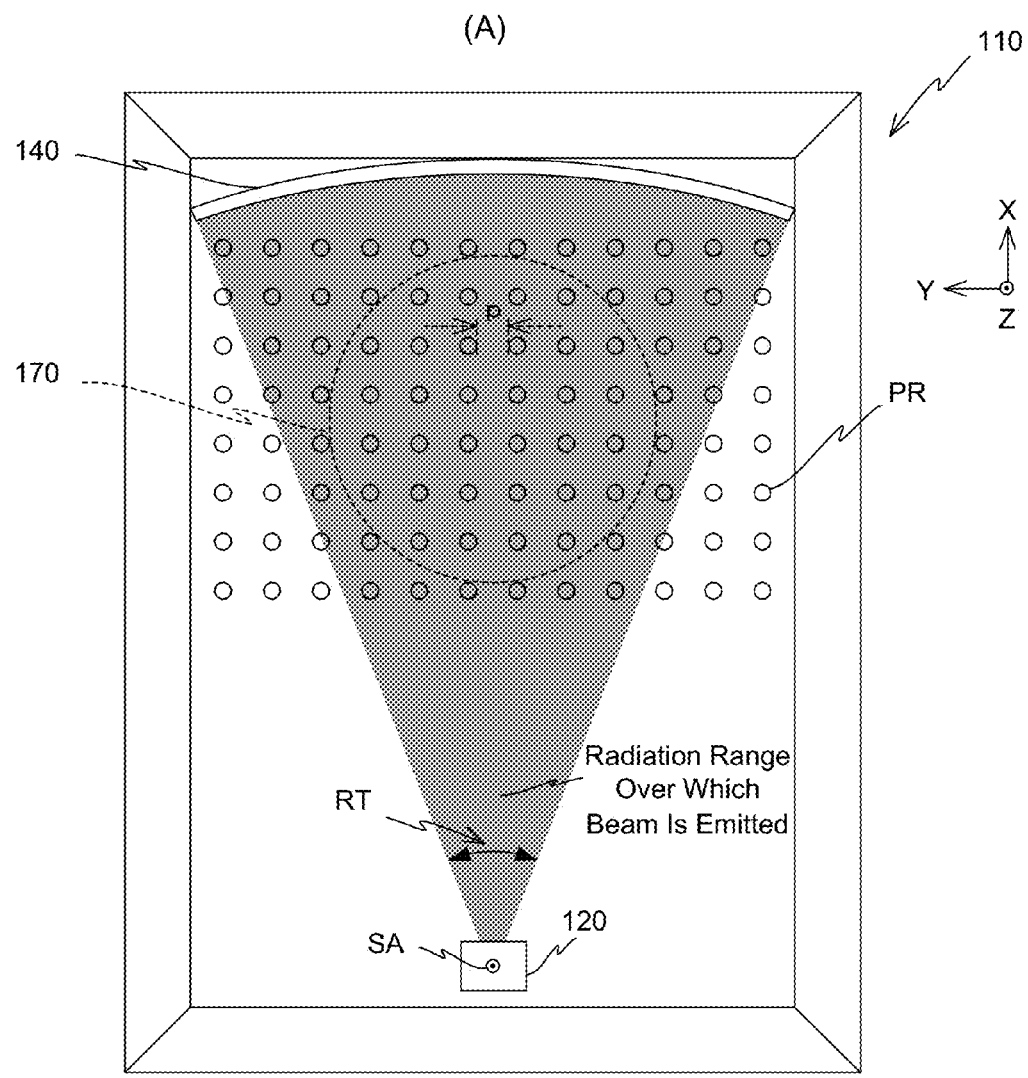
FIG. 3 is an external view for explanation of the configuration of the contactless charging unit of FIG. 1.
Figure 3:
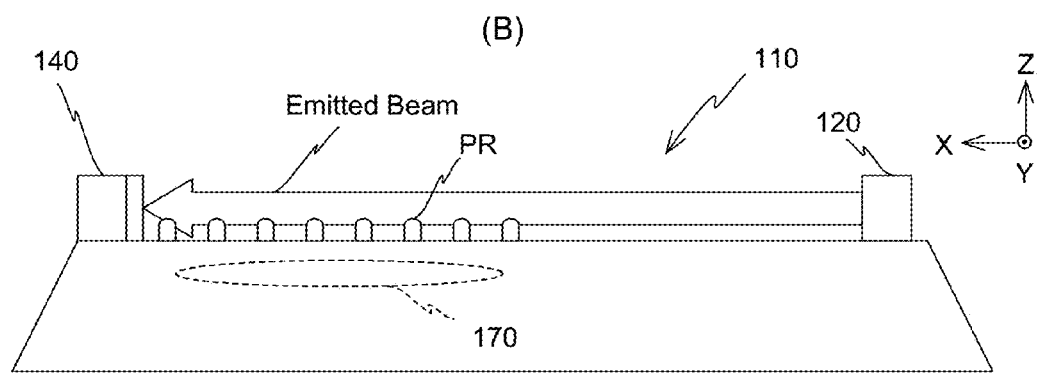

As shown overall in FIGS. 2 through 4, the contactless charging unit 110 comprises a beam reception and emission part 120, a reflection part 140, and a determination part 150. Moreover, the contactless charging unit 110 comprises a power supply part 160, a power transmission part 170, and a control part 180.

The beam reception and emission part 120 described above is disposed upon the upper surface of the casing of the contactless charging unit 110 toward the −X side thereof, and comprises a beam emission part 121 and a beam reception part 129 whose detailed configuration will be described hereinafter. Under control of the control part 180, the beam emission part 121 of the beam reception and emission part 120 emits a beam of laser light that moves over the upper portion of the power transmission part 170 so as to scan above the all over upper surface of the power transmission part 170 (refer to FIGS. 3(A) and 3(B)). In this embodiment, it is arranged for this laser beam to progress over a region that includes the upper ends of the plurality of projections. Note that, in the following explanation, the laser beam that is emitted by the beam emission part 121 is sometimes also termed the "emitted beam".

Furthermore, the beam reception part 129 of the beam reception and emission part 120 receives light that has been emitted by the beam emission part 121 and has been reflected by the reflection part 140, which is disposed upon the upper surface of the casing of the contactless charging unit 110 toward the +X side thereof. The details of the configuration of the beam reception and emission part 120 will be described hereinafter.

A plurality of minute corner cubes are arrayed on the surface of the reflection part 140 described above that faces towards the −X direction. Due to this, the laser beam that is incident upon the reflection part 140 is reflected in almost the opposite direction to its direction of incidence, and progresses back toward the beam reception and emission part 120. Note that, in the following explanation, the light that has been reflected by the reflection part 140 is termed "reflected light".

The determination part 150 described above receives the light reception result from the beam reception part 129. Moreover, the determination part 150 receives light emission control commands and rotation control commands sent from the control part 180. And, on the basis of the details of this light reception result and the details of the commands from the control part 180, the determination part 150 determines upon the presence or absence of a foreign body present upon the upper surface of the contactless charging unit 110 and supported upon at least one of the projections. And a normal light reception pattern, which is the pattern of light reception intensity when no foreign body is present upon the upper surface of the contactless charging unit 110, is stored by this determination part 150.

And, when determining as to the presence or absence of such a foreign body, the determination part 150 performs matching processing between the normal light reception pattern and the current light reception pattern. Next, the determination part 150 evaluates the degree of resemblance between the current light reception pattern and the normal light reception pattern, and decides than no foreign body is present upon the upper surface of the contactless charging unit 110 if it has determined that the current light reception pattern adequately resembles the normal light reception pattern. On the other hand, if the determination part 150 has determined that the current light reception pattern does not adequately resemble the normal light reception pattern, then the determination part 150 decides than some foreign body is present upon the upper surface of the contactless charging unit 110. The result of deciding upon the presence or absence of a foreign body in this manner is sent to the control part 180.

The power supply part 160 described above is connected to the power supply device 190, which is a source of power. And, according to power supply control commands sent from the control part 180, the power supply part 160 either performs supply of AC current to the power transmission part 170, or does not perform supply of such AC current.

The power transmission part 170 described above includes a power transmission coil that is housed within the casing of the contactless charging unit 110. And it is arranged for the power transmission part 170 to oppose the power reception part 210 that is disposed upon the vehicle CR, when electrical power is being supplied wirelessly to the onboard power reception device 200. When the power transmission part 170 receives supply of AC current from the power supply part 160, it flows AC current to its power transmission coil. And, when current flows to the power transmission coil in this manner, magnetic flux is generated from the power transmission coil in the direction parallel to the Z-axis.

The control part 180 described above is built around a central processing device (CPU) and circuitry peripheral thereto. The power supply function of the contactless charging device 100 is implemented by this control part 180 executing programs of various types.

During foreign body detection, the control part 180 generates light emission control commands and rotation control commands, and sends these commands to the beam emission part 121 and to the determination part 150. Moreover, during foreign body detection, the control part 180 receives the results of determination of foreign body presence or absence sent from the determination part 150.

And, if a decision is received to the effect that no foreign body is present upon the upper surface of the contactless charging unit 110, then the control part 180 generates a power supply control command whose contents are that a supply of power is to be provided to the onboard power reception device 200, and sends this power supply control command to the power supply part 160. On the other hand, if a decision is received to the effect that some foreign body is present upon the upper surface of the contactless charging unit 110, then the control part 180 generates a power supply control command whose contents are that no supply of power is to be provided to the onboard power reception device 200, and sends this power supply control command to the power supply part 160.

Moreover, when charging of the onboard power reception device 200 is to be started, the control part 180 receives a power supply start request from the onboard power reception device 200. And, when charging of the onboard power reception device 200 is completed, the control part 180 receives a power supply termination request from the onboard power reception device 200. The details of the control procedure executed by the control part 180 will be described hereinafter.

Note that the program executed by the control part 180 is recorded upon a recording medium such as a hard disk, a CD-ROM, a DVD or the like that can be read by a computer, and is loaded from that recording medium for execution. Moreover, this program could be acquired in a format recorded upon a transportable recording medium such as a CD-ROM, a DVD or the like; or it could also be acquired in a format distributed via a network such as the internet or the like.

(Configuration of the Beam Reception and Emission Part 120)

Next, the configuration of the abovementioned beam reception and emission part 120 will be explained.

Figure 6:
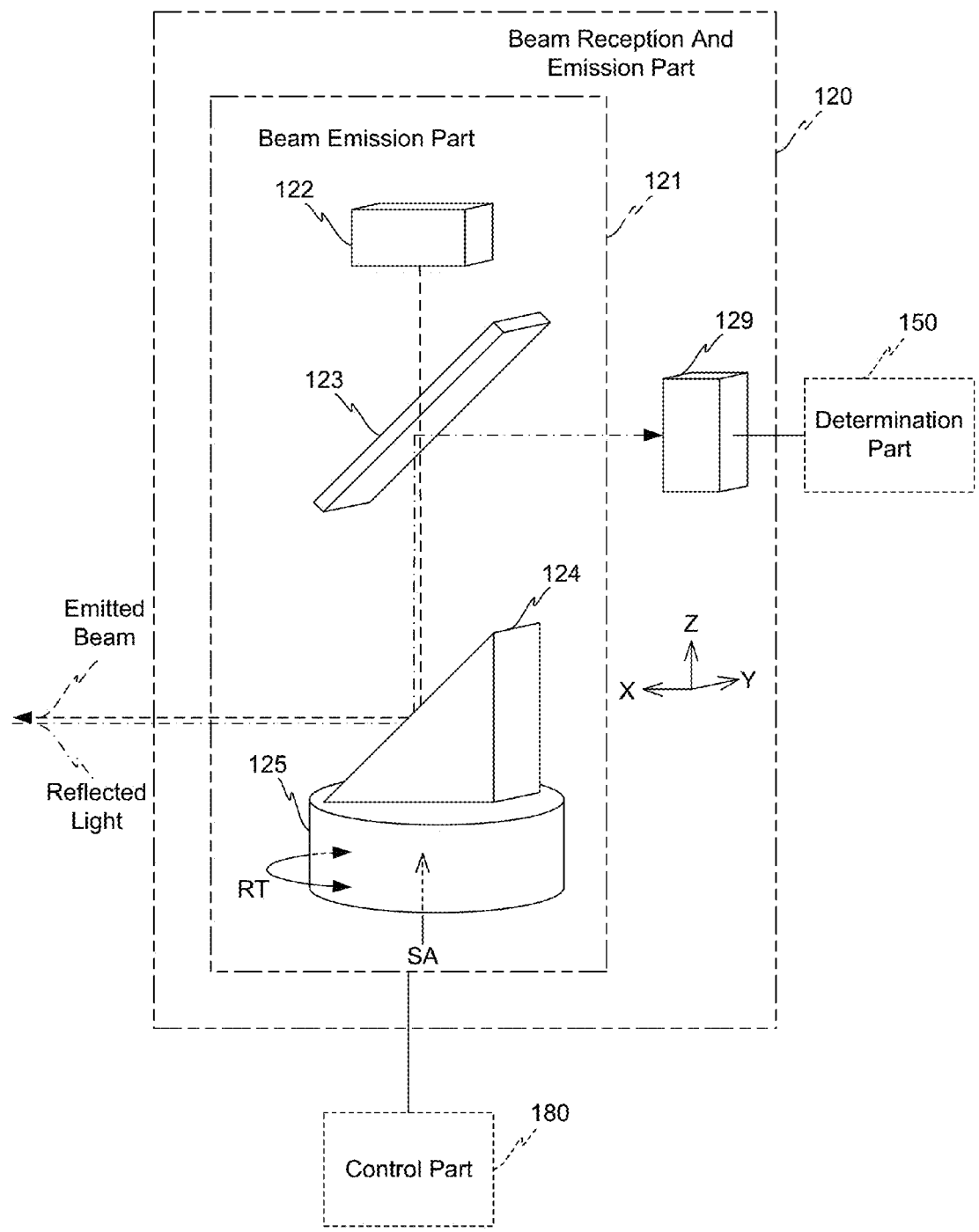
FIG. 6 is a figure for explanation of the configuration of a beam reception and emission part of FIGS. 2 and 3.

As shown overall in FIGS. 4 and 6, the beam reception and emission part 120 comprises a beam emission part 121 and a beam reception part 129.

As shown in FIG. 6, the abovementioned beam emission part 121 comprises a light emission element 122, a half mirror 123, a mirror 124, and a rotational drive part 125.

The abovementioned light emission element 122 emits a collimated beam of laser light (i.e. the emitted beam) upon receipt of the light emission control command sent from the control part 180. The laser beam that has been emitted from the light emission element 122 in this manner (i.e. the emitted beam) passes through the half mirror 123, and is reflected by the mirror 124. And the laser beam (the emitted beam) that has thus been reflected by the mirror 124 passes over the upper surface of the power transmission part 170 and progresses through a region that includes the upper ends of the plurality of projections (refer to FIG. 3(B)).

The abovementioned half mirror 123 allows the laser beam emitted by the light emission element 122 (the emitted beam) to pass through. Moreover, the half mirror 123 reflects the light that has been reflected by the reflection part 140 and that also has been reflected by the mirror 124. The light that has been reflected by the half mirror 123 in this manner (i.e. the reflected light) progresses back toward the beam reception part 129.

The mirror 124 described above is attached to the rotational drive part 125, and rotates around a reference axis SA along with that rotational drive part 125.

According to rotation control commands sent from the control part 180, the rotational drive part 125 described above rotates the mirror 124 around the reference axis SA, which is parallel to the Z axis and which coincides with the direction of progression of the laser beam emitted by the light emission element 122. The range RT over which this mirror 124 is rotated thus becomes the range over which the entire upper portion of the upper surface of the power transmission part 170 is scanned by the laser light (i.e. by the emitted laser beam) (refer to the radiation range shown in FIG. 3(A)).

In this manner, based upon control by the control part 180, the beam emission part 121 progressively changes the direction of emission of the laser beam (i.e. of the emitted beam) so as to scan above the all over upper surface of the power transmission part 170.

And the abovementioned beam reception part 129 is built around a light reception sensor. Via the mirror 124 and the half mirror 123, this beam reception part 129 receives the laser light that has been reflected by the reflection part 140 (i.e. the reflected light). And the beam reception part 129 sends the result of this light reception to the determination part 150.

Note that, in this embodiment, the beam reception part 129, the reflection part 140, and the determination part 150 fulfill the function of a body detection part.

[Operation]

The operation of the contactless charging device 100 having the configuration described above will now be explained, with attention being principally directed to the control procedure performed by the control part 180 for supply of power to the onboard power reception device 200.

As a preliminary, it will be supposed that the vehicle CR to which the onboard power reception device 200 is mounted is stopped in a parking place to which the contactless charging device 100 is installed. And it will be supposed that the power transmission part 170 of the contactless charging device 100 is positioned to oppose the power reception part 210 of the onboard power reception device 200. On the basis of this situation, upon receipt of the power supply start request issued by the onboard power reception device 200, the control part 180 starts the control procedure for supplying power to the onboard power reception device 200.

Figure 7:
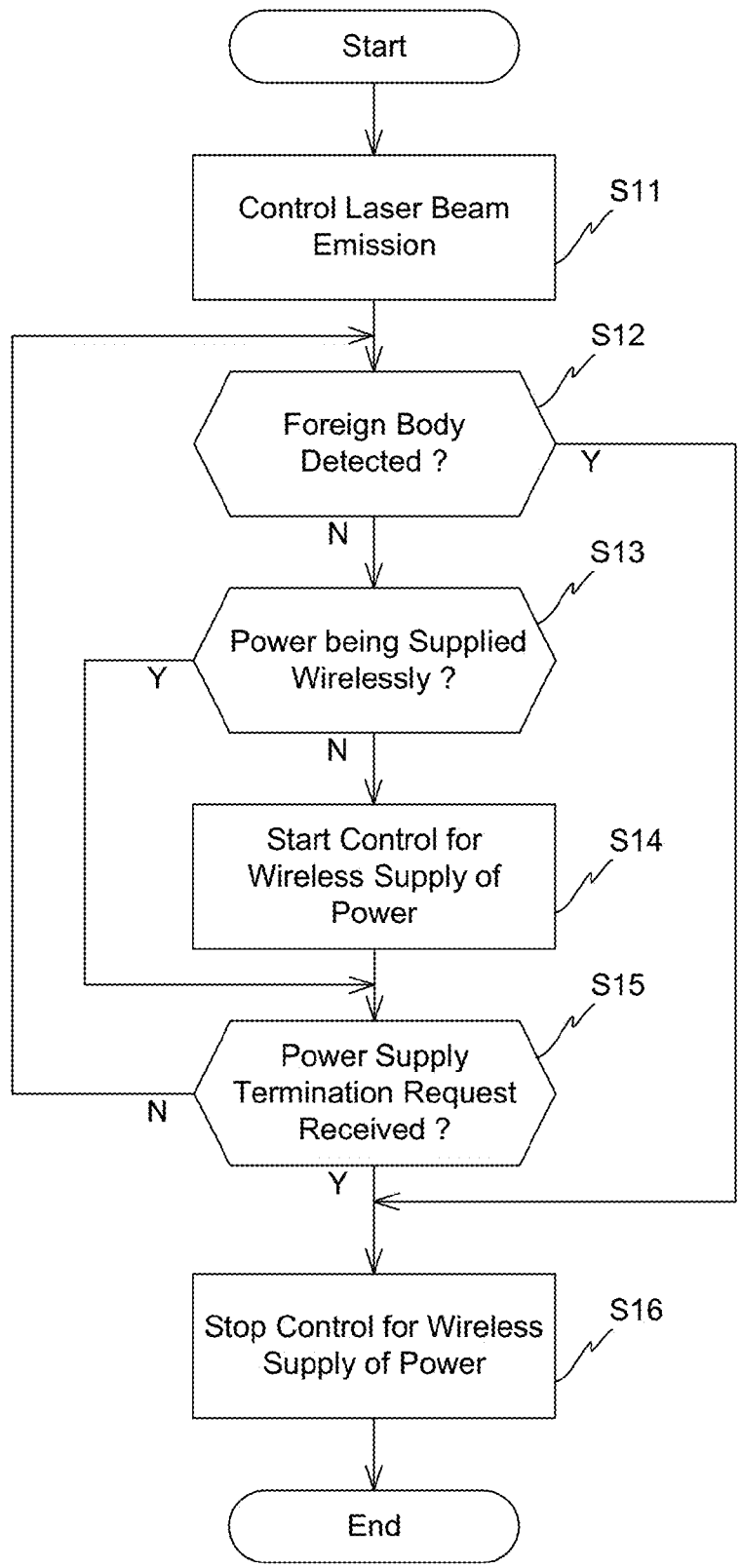
FIG. 7 is a flow chart for explanation of a procedure for controlling the supply of power by the contactless charging device to the onboard power reception device.
Figure 8:
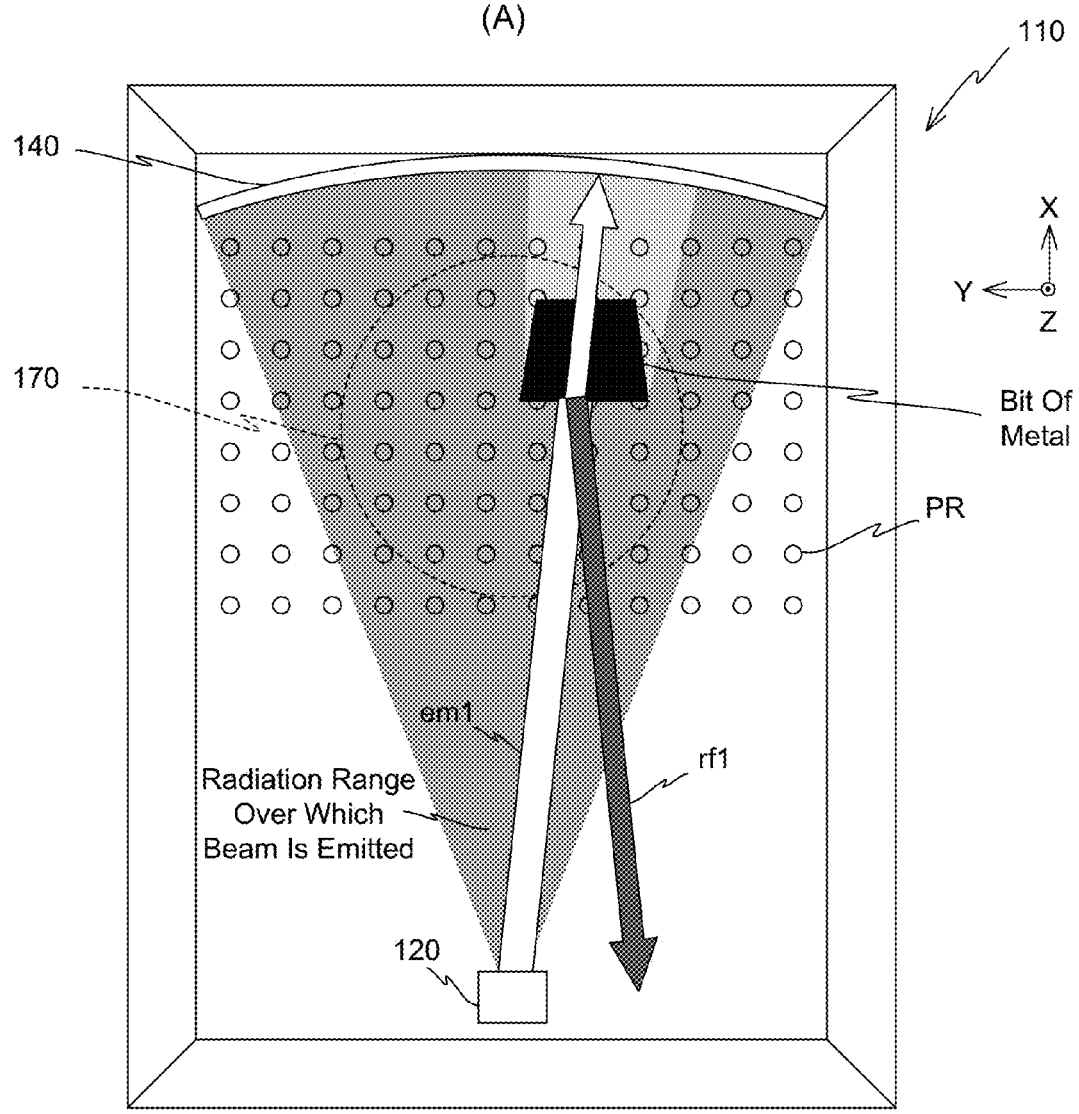
FIG. 8 is a figure for explanation of an example in which a foreign body is present upon the upper surface of the contactless charging unit (part 1 thereof)
Figure 8:
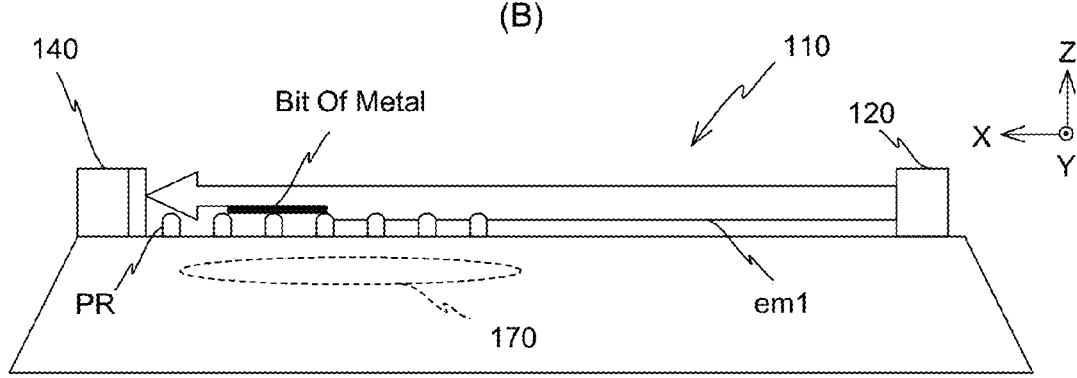
Figure 9:
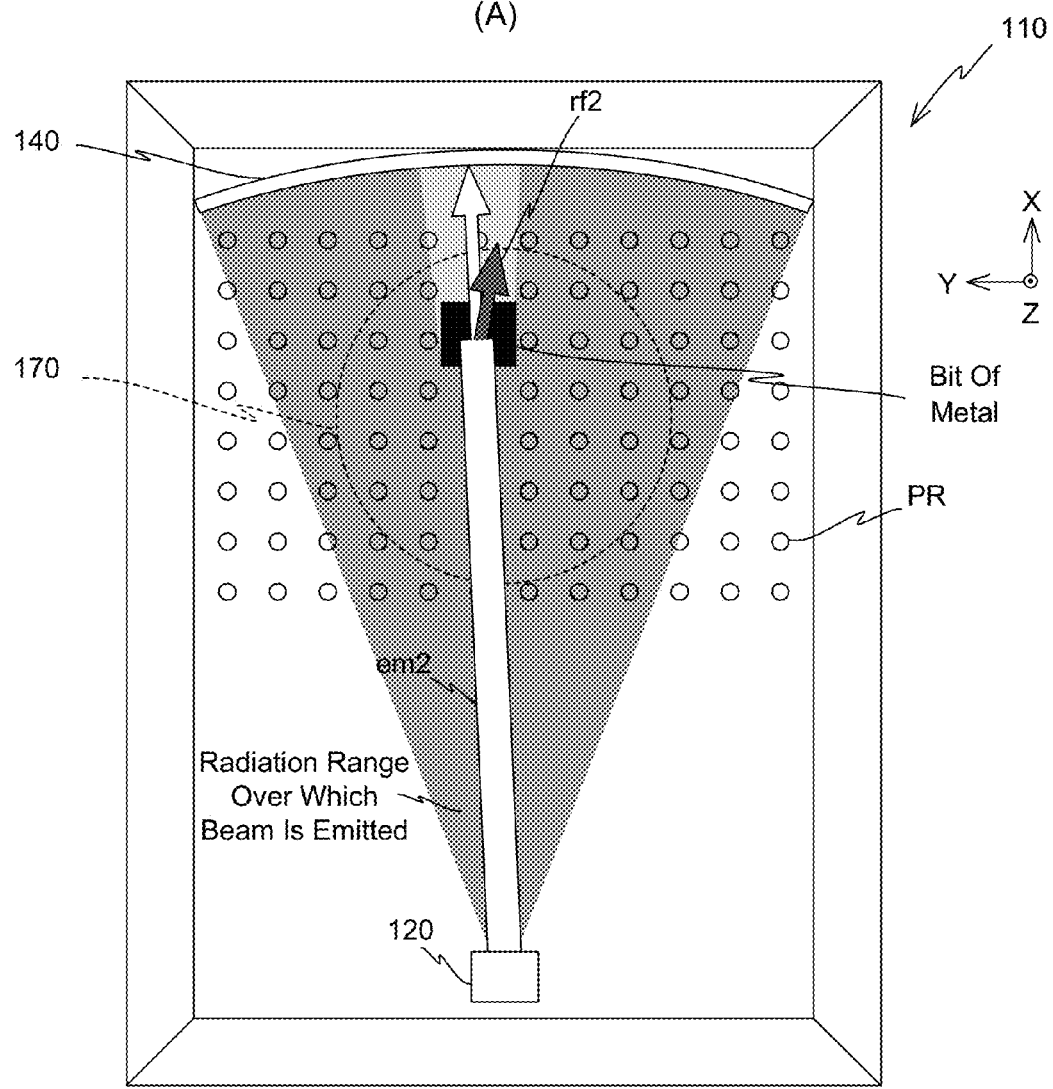
FIG. 9 is a figure for explanation of an example in which a foreign body is present upon the upper surface of the contactless charging unit (part 2 thereof)
Figure 9:
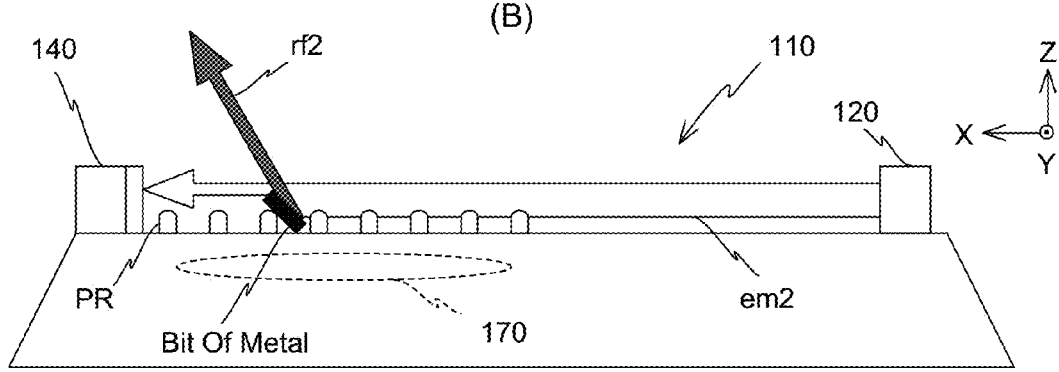

In this power supply control procedure, as shown in FIG. 7, first in a step S11 the control part 180 generates the light emission control command which is sent to the light emission element 122, and also generates the rotation control command which is sent to the rotational drive part 125.

In response to issue of these commands by the control part 180, a laser beam (i.e. an emitted beam) whose direction of emission is progressively changed is emitted so as to scan above the all over upper surface of the power transmission part 170 (refer to FIG. 3). Moreover, the beam reception part 129 receives the laser beam reflected by the reflection part 140 (i.e. the reflected beam), and sends the result of light reception to the determination part 150. And, on the basis of the abovementioned light reception result and the details of the commands by the control part 180, the determination part 150 determines whether or not a foreign body is present upon the upper surface of the contactless charging unit 110. And next the determination part 150 sends to the control part 180 the result of this decision as to whether or not a foreign body is present upon the upper surface of the contactless charging unit 110.

Next in a step S12, on the basis of this determination as to whether or not a foreign body is present upon the upper surface of the contactless charging unit 110, the control part 180 makes a decision as to whether or not a foreign body has been detected upon the upper surface of the contactless charging unit 110. And, if the result of this decision is negative (N in the step S12), the flow of control proceeds to a step S13.

In the step S13, the control part 180 makes a decision as to whether or not wireless supply of electrical power to the onboard power reception device 200 is currently being performed. If the result of this decision is affirmative (Y in the step S13), then the flow of control is transferred to a step S15 which will be described hereinafter.

On the other hand, if the result of the decision in the step S13 is negative (N in the step S13), then the flow of control proceeds to a step S14. In this step S14, the control part 180 generates a power supply control command having contents specifying that power supply is to be performed to the onboard power reception device 200, and sends this command to the power supply part 160. When this power supply control command whose contents are that power supply is to be performed is sent to the power supply part 160 in this manner, the power supply part 160 performs supply of AC current to the power transmission part 170. And, when this AC current flows in the power transmission coil, magnetic flux is generated from that power transmission coil in the +Z direction. As a result, the supply of wireless power to the onboard power reception device 200 is started.

Next, in the step S15, the control part 180 makes a decision as to whether or not the power supply termination request transmitted from the onboard power reception device 200 has been received. If the result of this decision is negative (N in the step S15), then the flow of control returns to the step S12.

On the other hand, if the result of the decision in the step S15 is affirmative (Y in the step S15), or if the result of the decision in the step S12 described above is affirmative (Y in the step S12), then the flow of control proceeds to a step S16. In this step S16, the control part 180 generates a power supply control command having contents specifying that power supply is not to be performed to the onboard power reception device 200, and sends this command to the power supply part 160. As a result, the wireless supply of electrical power to the onboard power reception device 200 is stopped. When the wireless supply of electrical power has been stopped in this manner, this control procedure for supply of power to the onboard power reception device 200 terminates.

Next, examples in which a bit of metal is present upon the upper surface of the contactless charging unit 110 and this bit of metal is detected as a foreign body, in other words examples of the state when the result of the decision in the step S12 is affirmative, are shown in FIGS. 8(A) and 8(B), and in FIGS. 9(A) and 9(B). FIGS. 8(A) and 8(B) show an example when the laser beam (em1) emitted by the beam emission part 121 has struck a bit of metal that is being supported by nine projections. In this type of example, a portion of the laser beam (em1) emitted by the beam emission part 121 reaches the reflection part 140, while another portion does not arrive at the reflection part 140 but is reflected away by the bit of metal. And the light (rf1) reflected by the bit of metal does not reach the beam reception part 129.

Moreover, the portion of the laser beam that arrives at the reflection part 140 and is reflected progresses toward the beam reception part 129. When the light received by the beam reception part 129 in this manner is just this portion of the laser beam (em1), the light reception intensity becomes lower, as compared to when the entire laser beam has been received. For example, if the thickness of the bit of metal is 1.0 mm and the diameter of the laser beam emitted by the beam emission part 121 is 10.0 mm, then the intensity of the light received by the beam reception part 129 is reduced by around 10%, as compared to what it would have been if that bit of metal had not been present upon the upper surface of the contactless charging unit 110. Upon receipt of this type of light reception result, the determination part 150 decides that a foreign body is present upon the upper surface of the contactless charging unit 110.

Furthermore, FIGS. 9(A) and 9(B) show an example when the laser beam (em2) emitted by the beam emission part 121 has struck a bit of metal that is being supported by a single projection. In this type of example, since this bit of metal is inclined with respect to the XY plane, accordingly the laser beam (em2) emitted by the beam emission part 121 is almost entirely reflected away by the bit of metal, and hardly any of it arrives at the reflection part 140. The light that is reflected away by the bit of metal (rf2) does not arrive at the beam reception part 129. Moreover, only a small portion of the laser beam that arrives at the reflection part 140 and that is reflected progresses toward the beam reception part 129. When in this manner the light received by the beam reception part 129 is only a very small portion of the laser beam (em2), then the light reception intensity becomes greatly reduced, as compared to the case when the entire laser beam is received. Upon receipt of this type of light reception result, the determination part 150 decides that a foreign body is present upon the upper surface of the contactless charging unit 110.

As has been explained above, in this embodiment, the plurality of projections are arranged in a lattice configuration upon the upper surface of the casing of the contactless charging unit 110. And, during wireless supply of electrical power to the onboard power reception device 200 mounted to the vehicle CR, under control by the control part 180, the beam emission part 121 emits a laser beam that progresses over the upper surface of the power transmission part 170, so as to scan above the all over upper surface of the power transmission part 170. And, upon receipt of the reflected light, the beam reception part 129 sends the result of light reception to the determination part 150. Moreover, on the basis of the result of light reception sent from the beam reception part 129, the determination part 150 determines upon the presence or absence of a foreign body supported upon at least one of the projections that are present upon the upper surface of the contactless charging unit 110, and sends the result of this determination to the control part 180. Next, if the result of this decision is that no foreign body is present upon the upper surface of the contactless charging unit 110, then the control part 180 generates the power supply control command whose contents are that power supply is to be performed to the onboard power reception device 200, and sends this command to the power supply part 160. On the other hand, if the result of the above decision is that some foreign body is present upon the upper surface of the contactless charging unit 110, then the control part 180 generates the power supply control command whose contents are that power supply to the onboard power reception device 200 is not to be performed, and sends this command to the power supply part 160.

Due to this, it is possible to detect the presence of a foreign body above the power transmission part of the contactless charging device (i.e. above its power transmission coil) with good accuracy.

Furthermore, in this embodiment, the beam emission part 121 and the beam reception part 129 are disposed at a location somewhat separated from the power transmission coil of the power transmission part 170. Due to this, the beam emission part 121 and the beam reception part 129 do not become heated up by induced heat due to the magnetic flux generated from the power transmission coil.

Yet further, in this embodiment, since the laser beam emitted by the beam emission part 121 progresses over the upper ends of the plurality of projections, accordingly, if a drop of water is present upon the upper surface of the casing of the contactless charging unit 110, this water drop is not detected as being a foreign body.

Thus, according to this embodiment, it is possible to perform wireless supply of electrical power by employing a contactless method without any problem arising with regard to safety.

Modification of Embodiment

The present invention is not to be considered as being limited to the embodiment described above; alterations of various types could be made.

For example, in the embodiment described above, it was arranged for the onboard power reception device 200 to transmit a power supply start request to the contactless charging device 100 when charging is to be started. By contrast, it would also be acceptable to arrange for charging to be started, by information to the effect that supply of electrical power is starting being transmitted from the contactless charging device 100 to the onboard power reception device 200.

Figure 10:
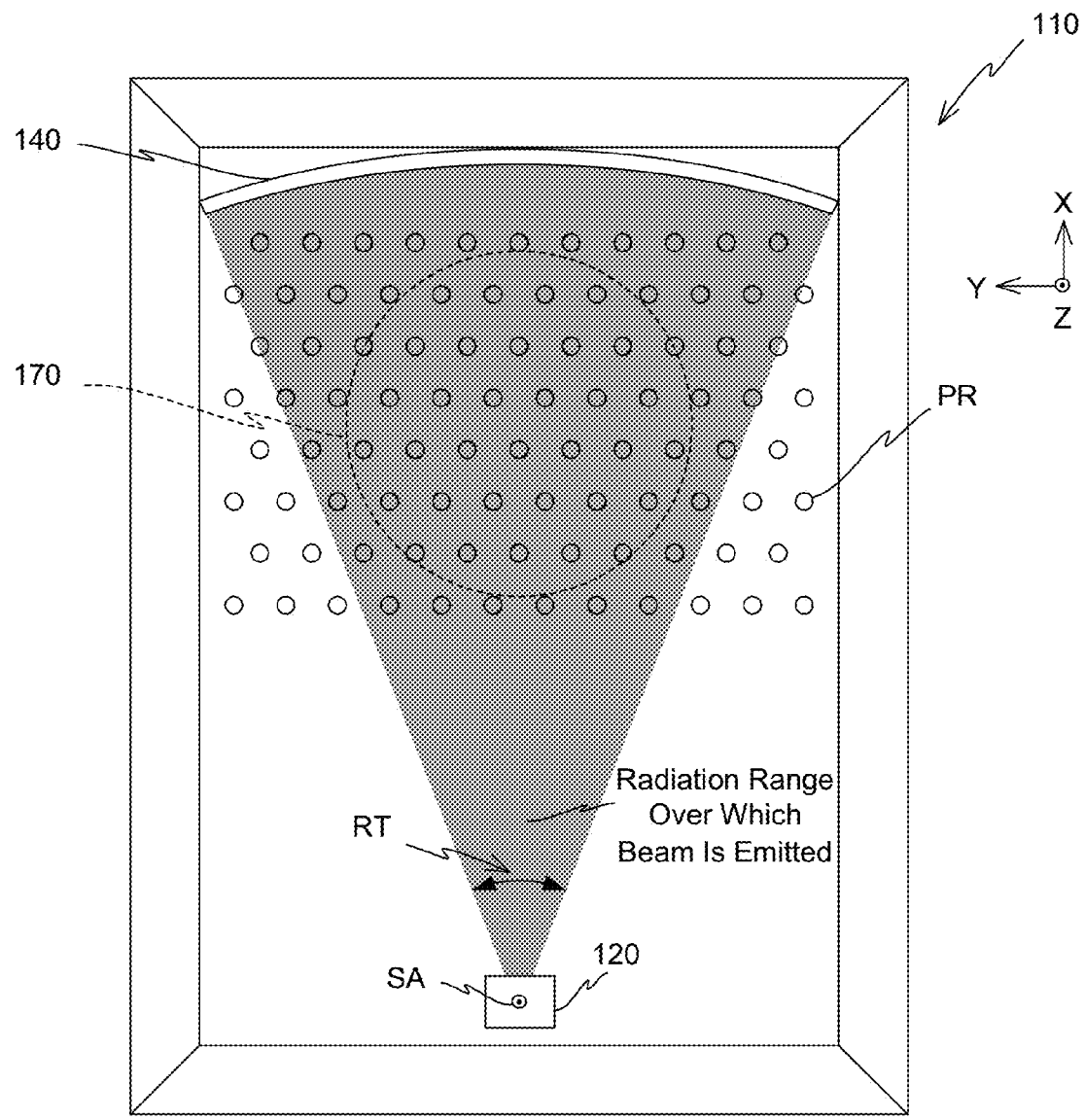
FIG. 10 is a figure for explanation of a variant embodiment (part 1 thereof)

Moreover, in the embodiment described above, the plurality of projections were arranged in the form of a lattice upon the upper surface of the casing of the contactless charging unit 110. By contrast, as shown in FIG. 10, it would also be acceptable to arrange for the plurality of projections to be arranged in a zigzag configuration upon the upper surface of the casing of the contactless charging unit 110, with the gaps between the projections being determined according to the shape of the body that is supposed will be the subject of detection.

Figure 11:
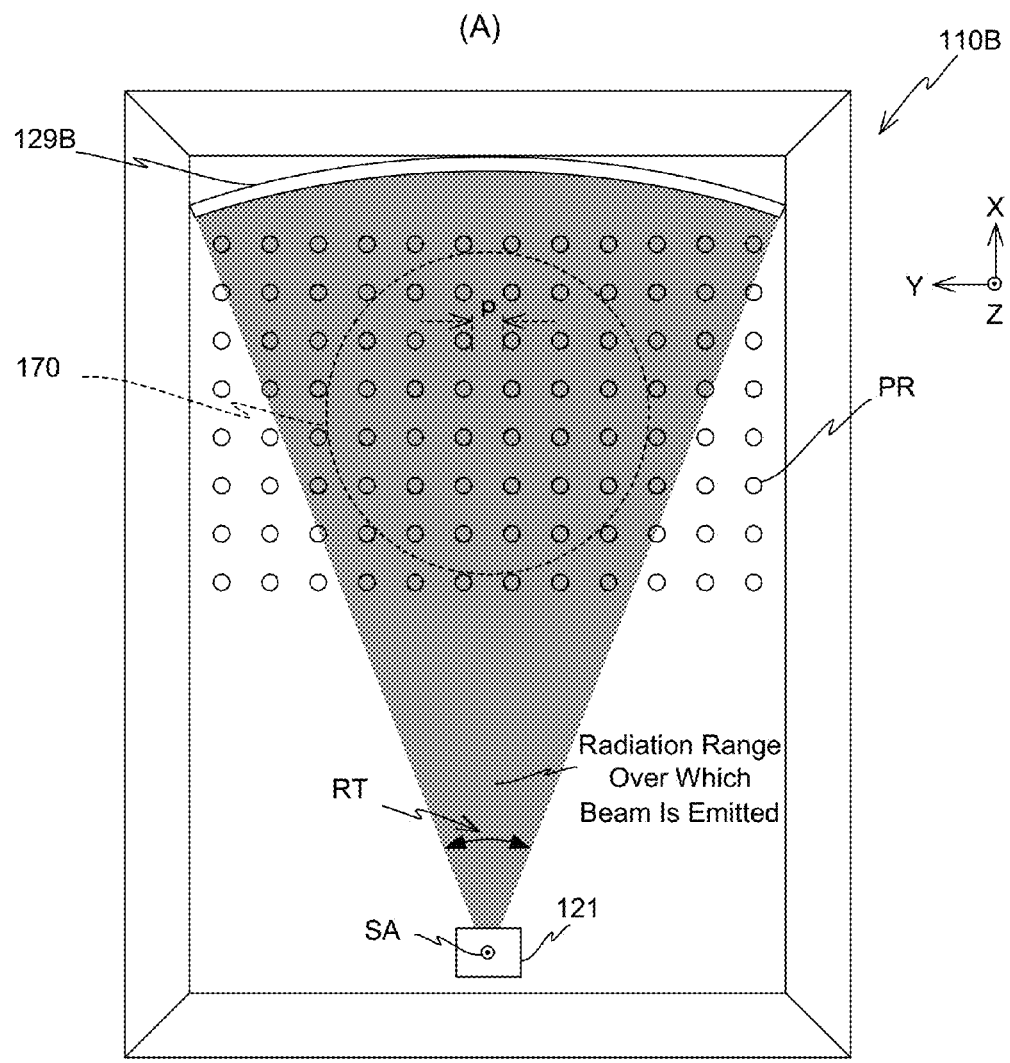
FIG. 11 is a figure for explanation of a variant embodiment (part 2 thereof).
Figure 11:
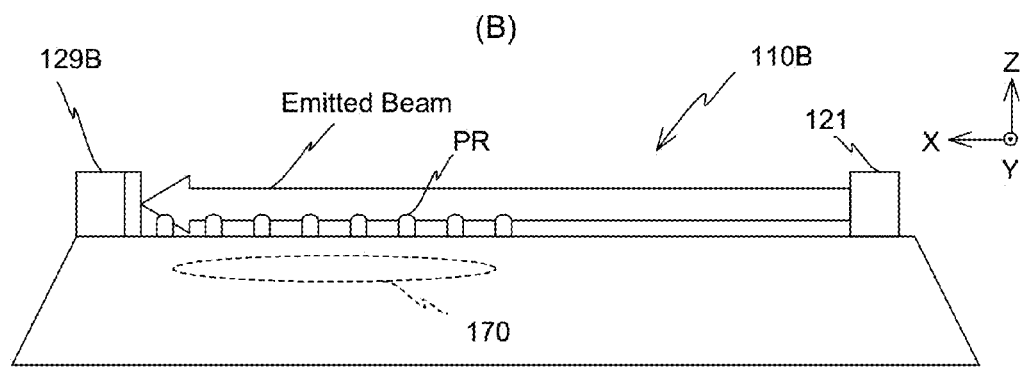

Furthermore, in the embodiment described above, it was arranged for the beam reception and emission part 120 including the beam emission part 121 and the beam reception part 129 to be disposed at the −X direction side of the upper surface of the casing of the contactless charging unit 110. By contrast, as shown in FIG. 11, it would also be acceptable to arrange for the beam emission part 121 to be disposed at the −X direction side of the upper surface of the casing of the contactless charging unit 110, with a beam reception part 129B being disposed at the +X direction side of the upper surface of the casing of the contactless charging unit 110. In this case it would be possible to omit the reflection part, and the beam reception part 129B and the determination part 150 would fulfill the function of the body detection part. Moreover, if this structure is employed, then light reception elements would be arranged upon the entire surface of the beam reception part 129B in the −X direction side.

Yet further, the configurations of the beam emission part and the beam reception part are not limited to be those described above; any other configurations would be acceptable, provided that it is possible to emit the light, so as to scan above the all over upper portion of the upper surface of the power transmission part 170, and to receive the emitted light. For example while, in the embodiment described above, it was arranged to provide a single beam reception and emission part, it would also be acceptable to arrange to provide two or more beam reception and emission parts.

Even further, in the embodiment described above, it was arranged for foreign body detection processing to be performed directly before starting the supply of power to the onboard power reception device 200, or during supply of power thereto. By contrast, it would also be acceptable to arrange to perform foreign body detection processing periodically for maintenance inspection of the contactless charging device 100, irrespective of whether or not supply of electrical power is to be performed at that time.

Still further, in the embodiment described above, it was arranged to stop the wireless supply of electrical power to the onboard power reception device if a foreign body was detected upon the upper surface of the contactless charging unit; but it would also be acceptable to arrange to issue a notification to the user to the effect that a foreign body has been detected upon the upper surface of the contactless charging unit.

Yet further, with the contactless charging device of the embodiment described above, it was arranged for electrical power to be supplied wirelessly by the electromagnetic induction method, it would also be acceptable to arrange for electrical power to be supplied wirelessly by some other method, such as a radio wave method employing microwaves or the like, or a magnetic field resonance method or the like.

Even further while, in the embodiment described above, the invention of the present application was applied to a contactless charging device that supplied electrical power wirelessly to an electric automobile, of course it would also be possible to apply the invention of the present application to a contactless charging device that supplies electrical power wirelessly to a hybrid automobile.

The invention claimed is:

1. A contactless charging device having a power transmission part that supplies power wirelessly to an external power reception part, comprising:
a plurality of projections that are disposed on the upper surface of said power transmission part;
a beam emission part emitting light that progresses over the upper surface of said power transmission part;
a body detection part, on the basis of light emitted by said beam emission part, detecting the presence or absence of a body that is supported by at least one of said projections; and
a control part controlling the supply of power by said power transmission part on the basis of the result of detection by said body detection part.

2. The contactless charging device according to claim 1, wherein:
said plurality of projections are all of the same height; and
the light emitted by said beam emission part progresses through a region that includes a position at said height from said upper surface of said power transmission part.

3. The contactless charging device according to claim 2, wherein said plurality of projections are arranged in a lattice configuration, and the gaps between neighboring ones of said projections are set in advance according to the shape of a body that is supposed to be the subject of detection by said body detection part.

4. The contactless charging device according to claim 2, wherein said plurality of projections are arranged in a zigzag configuration, and the gaps between neighboring ones of said projections are set in advance according to the shape of a body that is supposed to be the subject of detection by said body detection part.

5. The contactless charging device according to claim 1, wherein said body detection part comprises:
a reflection part reflecting light emitted by said beam emission part and progressing over the upper surface of said power transmission part;
a beam reception part receiving light reflected by said reflection part; and
a determination part determining upon the presence or absence of a body that is supported by at least one of said projections, on the basis of the result of light reception by said beam reception part.

6. The contactless charging device according to claim 1, wherein:
the light emitted by said beam emission part is a laser beam; and
said beam emission part progressively changes the direction of emission of said laser beam from said beam emission part, so that said laser beam scans the entire upper portion of the upper surface of said power transmission part.

7. A method for controlling a power supply used in a contactless charging device having both of a power transmission part that supplies power wirelessly to an external power reception part, and a plurality of projections that are disposed on the upper surface of said power transmission part, comprising the steps of:
a light emission process of a beam emission part emitting light that progresses over the upper surface of said power transmission part;
a body detection process of, on the basis of light emitted by said beam emission part detecting the presence or absence of a body that is supported by at least one of said projections; and
a control process of controlling the supply of power by said power transmission part on the basis of the result of detection by said body detection process.

8. A non-transient computer readable medium having recorded thereon a power supply control program that, when executed, causes a computer in a contactless charging device having a power transmission part that supplies power wirelessly to an external power reception part to execute the method for controlling a power supply according to claim 7.

* * * * *